(12) United States Patent
Liao et al.

(10) Patent No.: US 9,429,763 B2
(45) Date of Patent: Aug. 30, 2016

(54) LIQUID CRYSTAL LENS AND LIQUID CRYSTAL DISPLAY DEVICE

(71) Applicant: Shenzhen China Star Optoelectronics Technology Co., Ltd., Shenzhen, Guangdong (CN)

(72) Inventors: Qiaosheng Liao, Guangdong (CN); Chih-ming Yang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 87 days.

(21) Appl. No.: 14/396,044

(22) PCT Filed: Sep. 28, 2014

(86) PCT No.: PCT/CN2014/087642
§ 371 (c)(1),
(2) Date: Oct. 21, 2014

(87) PCT Pub. No.: WO2016/045110
PCT Pub. Date: Mar. 31, 2016

(65) Prior Publication Data
US 2016/0085082 A1    Mar. 24, 2016

(30) Foreign Application Priority Data
Sep. 24, 2014 (CN) .......................... 2014 1 0495665

(51) Int. Cl.
*G02B 27/22* (2006.01)
*G02F 1/1333* (2006.01)
*G02F 1/1343* (2006.01)
*G02F 1/1335* (2006.01)

(52) U.S. Cl.
CPC ..... *G02B 27/2214* (2013.01); *G02F 1/133345* (2013.01); *G02F 1/133526* (2013.01); *G02F 1/134309* (2013.01)

(58) Field of Classification Search
CPC ................... G02F 1/134309; G02F 1/133345; G02B 27/2214
See application file for complete search history.

(56) References Cited

U.S. PATENT DOCUMENTS

| | | | | |
|---|---|---|---|---|
| 8,675,148 B2* | 3/2014 | Takagi | ............... | G02B 27/2214 349/139 |
| 8,692,971 B2* | 4/2014 | Chiu | .................. | G02B 27/2214 349/15 |
| 9,128,332 B2* | 9/2015 | Kim | ................... | G02F 1/134309 |
| 2011/0102689 A1* | 5/2011 | Chiu | .................. | G02B 27/2214 349/15 |
| 2014/0198099 A1* | 7/2014 | Tseng | ................. | G02B 27/2214 345/419 |
| 2015/0077669 A1* | 3/2015 | Wu | ........................ | G02B 27/22 349/33 |

\* cited by examiner

*Primary Examiner* — Richard Kim
*Assistant Examiner* — Kendrick Hsu
(74) *Attorney, Agent, or Firm* — Andrew C. Cheng

(57) ABSTRACT

A liquid crystal lens and a liquid crystal display device. The liquid crystal lens includes a first substrate, a second substrate deposed oppositely, and a liquid crystal layer. A metal layer, an insulation layer, and an electrode layer are stacked on the second substrate adjacent to the first substrate. The electrode layer includes multiple electrodes disposed separately. Wherein, among the multiple electrodes disposed separately, a height of the electrode which a maximum voltage is applied on is lower than a height of an adjacent electrode. By the above way, the actual equivalent refractive index $n_{eff}$ of the liquid crystal molecules corresponding to the electrode which the maximum voltage is applied on is close to an equivalent refractive index in an ideal condition. As a result, the three-dimensional (3D) crosstalk can be reduced and the 3D display effect can be improved.

2 Claims, 2 Drawing Sheets

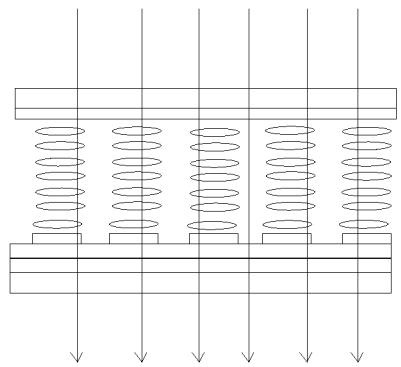
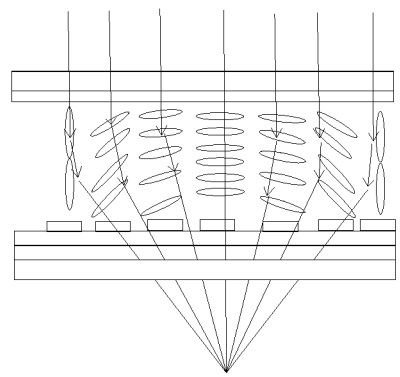
FIG. 1a
FIG. 1b
FIG. 1 (prior art)
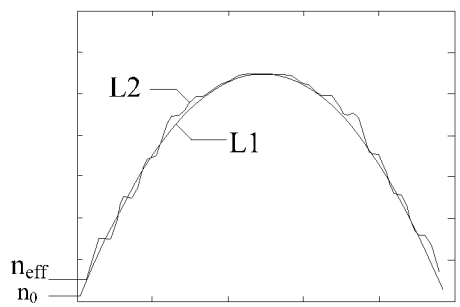
FIG. 2 (prior art)
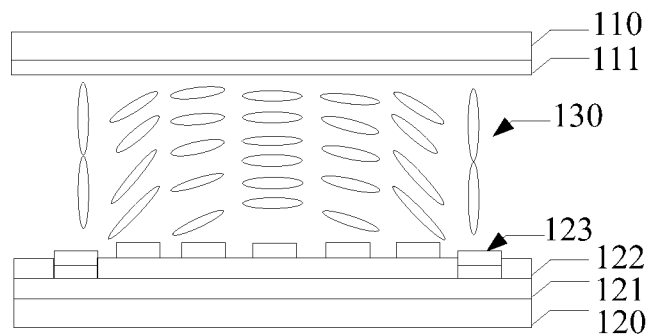
FIG. 3

LIQUID CRYSTAL LENS AND LIQUID CRYSTAL DISPLAY DEVICE

BACKGROUND OF THE INVENTION

1. Field of the Invention

The present application relates to a technical field of a display apparatus, and more particularly to a liquid crystal lens and a liquid crystal display device.

2. Description of Related Art

A stereoscopic display device usually adopts a naked-eye three-dimensional display. The naked-eye three-dimensional display mainly installs a light splitting device such as a liquid crystal lens at a light-emitting side of a two-dimensional (2D) display panel to respectively transmit an image having a left-right parallax and displayed on the screen panel to a viewer's left eye and right eye. Through the mixing of the brain, the viewer can obtain a stereoscopic perception.

Wherein, the liquid crystal lens mainly adopts a transparent material to manufacture a rod-lens array with a certain size. Through refraction, the lights in different pixels of the display panel emit with different polarization directions in order to separate the image having the left-right parallax.

With reference to FIG. 1, FIG. 1 is a schematic diagram of a lens unit of a liquid crystal lens according to the prior art. As shown in FIG. 1a, when no voltage is applied on the liquid crystal lens, the deflection directions of the liquid crystal molecules corresponding to two adjacent and strip-shaped electrodes are the same. At this time, a center and an edge of the liquid crystal layer corresponding to the electrodes have no difference in the refractive index.

As shown in FIG. 1b, when a voltage is applied on each of the electrodes of the liquid crystal lens, the liquid crystal molecules generate deflections under the function of the electric field. The center and the edge of the liquid crystal layer corresponding to the electrodes generate a difference in the refractive index. In a focus mode, phases form a lens-like distribution. The viewer can obtain a 3D image having a left-right parallax. Wherein, different electrodes are applied with different voltages. The liquid crystal molecules corresponding to the electrode which a maximum voltage is applied on are straightest such that the equivalent refractive index $n_{eff}$ is the smallest. Two electrodes which the maximum voltage is applied define an opening width value of one lens unit.

As shown in FIG. 2, L1 is a curve diagram of the equivalent refractive index corresponding to the lens unit of the liquid crystal lens in an ideal condition, and L2 is a curve diagram of the equivalent refractive index corresponding to the lens unit of the liquid crystal lens in an actual condition. Wherein, in the ideal condition, when the electrode is applied with a maximum voltage, the equivalent refractive index $n_{eff}$ of the liquid crystal molecules is $n_0$ ($n_0$=1.55).

Because the liquid crystal molecules are affected by an alignment film and the liquid crystal molecules squeeze and push with each other at an edge of two lens units. As a result, when the maximum voltage is applied on the edge of the two adjacent lens units, the liquid crystal molecules corresponding to the strip-shaped electrode at the edge of the two adjacent lens units cannot be completely straight. The above situation cannot be improved even increasing the maximum voltage such that the actual $n_{eff}$ is greater than $n_0$. As a result, the three-dimensional (3D) crosstalk is generated and the 3D display effect is affected.

SUMMARY OF THE INVENTION

The main technical problem solved by the present invention is to provide a liquid crystal lens and a liquid crystal display device such that the actual equivalent refractive index of the liquid crystal molecules corresponding to the electrode which the maximum voltage is applied on is close to an equivalent refractive index in an ideal condition. As a result, the three dimensional (3D) crosstalk can be reduced and the 3D display effect can be improved.

In order to solve the above technical problem, an embodiment of the present invention provides: a liquid crystal lens, comprising: a first substrate; a second substrate disposed oppositely to the first substrate; a liquid crystal layer disposed between the first substrate and the second substrate; and multiple lens units, wherein, a first and a second electrode of each of the lens units are applied with a same and maximum voltage; wherein, a metal layer, an insulation layer, and an electrode layer are stacked on a side of the second substrate adjacent to the first substrate; the electrode layer includes multiple electrodes disposed separately; among the multiple electrodes disposed separately, a height of the insulation layer corresponding to the electrode which the maximum voltage is applied on is lower than a height of the insulation layer corresponding to an adjacent electrode such that a height of the electrode which the maximum voltage is applied on is lower than a height of the adjacent electrode.

Wherein, the insulation layer corresponding to the electrode which the maximum voltage is applied on is empty such that the height of the electrode which the maximum voltage is applied on is lower than the height of the adjacent electrode.

Wherein, the maximum voltage applied on the first and the last electrodes is 12V.

In order to solve the above technical problem, another embodiment of the present invention provides: a liquid crystal lens, comprising: a first substrate; a second substrate disposed oppositely to the first substrate; and a liquid crystal layer disposed between the first substrate and the second substrate; wherein, a metal layer, an insulation layer, and an electrode layer are stacked on a side of the second substrate adjacent to the first substrate; the electrode layer includes multiple electrodes disposed separately; among the multiple electrodes disposed separately, a height of the electrode which a maximum voltage is applied on is lower than a height of an adjacent electrode.

In order to solve the above technical problem, another embodiment of the present invention provides: a liquid crystal display device including a liquid crystal lens and a display screen, and the liquid crystal lens is disposed on a surface of the display screen, wherein, the liquid crystal lens comprises: a first substrate; a second substrate disposed oppositely to the first substrate; and a liquid crystal layer disposed between the first substrate and the second substrate; wherein, a metal layer, an insulation layer, and an electrode layer are stacked on a side of the second substrate adjacent to the first substrate; the electrode layer includes multiple electrodes disposed separately; among the multiple electrodes disposed separately, a height of the electrode which a maximum voltage is applied on is lower than a height of an adjacent electrode.

The beneficial effect of the present application is: comparing to the prior art, through the height of the electrode which the maximum voltage is applied on is lower than the height of the adjacent electrode. And using the function of the side electric field to reduce the squeeze-push behavior between the liquid crystal molecules corresponding to the electrode which the maximum voltage is applied on and the adjacent electrode such that the actual equivalent refractive index of the liquid crystal molecules corresponding to the electrode which the maximum voltage is applied on is close to an equivalent refractive index in an ideal condition. As a result, the three-dimensional (3D) crosstalk can be reduced and the 3D display effect can be improved.

BRIEF DESCRIPTION OF THE DRAWINGS

FIG. 1 is a schematic diagram of a lens unit of a liquid crystal lens according to the prior art;

FIG. 2 is a curve diagram of the equivalent refractive index of the lens unit in FIG. 1;

FIG. 3 is a schematic diagram of a lens unit of a liquid crystal lens according to an embodiment of the present invention;

DETAILED DESCRIPTION OF THE PREFERRED EMBODIMENT

Figure 4:
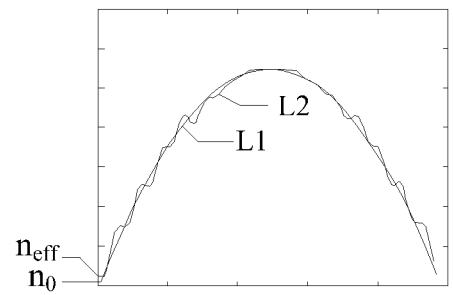
FIG. 4 is a curve diagram of the equivalent refractive index corresponding to the lens unit in FIG. 3.

The following description is for the purpose of illustration not for limitation, and specific details are proposed such as the system configuration, the interface, and the technique in order to completely understand the present application. However, the person skilled in the art should know, in other embodiments without these specific details can also achieve the present application. In other instances, well-known devices, circuits and methods are omitted to prevent the unnecessary details hindering the description of the present application.

With reference to FIG. 3, FIG. 3 is a schematic diagram of a lens unit of a liquid crystal lens according to the present invention. Wherein, a liquid crystal lens may include multiple lens units, and the structures of the multiple lens units are the same. In the present embodiment, the liquid crystal lens includes: a first substrate 110, a second substrate 120 disposed oppositely to the first substrate 110, and a liquid crystal layer 130 disposed between the first substrate 110 and the second substrate 120.

An electrode layer 111 is disposed at a side of the first substrate 110 adjacent to the second substrate 120. The electrode layer 111 is a common electrode. The common electrode 111 is an entire transparent indium-tin-oxide (ITO) electrode.

A metal layer 121, an insulation layer 122, and an electrode layer 123 are disposed at a side of the second substrate 120 adjacent to the first substrate 110. The electrode layer 123 includes multiple electrodes disposed separately. Wherein, a height of the electrode which a max voltage is applied on is lower than a height of an adjacent electrode. Two electrodes which the max voltage is applied voltage define an open width of a lens unit. That is, the two electrodes which the max voltage is applied on and the electrodes disposed between the two electrodes are defined as a lens unit. Each of the electrodes is a strip-shaped electrode.

When no voltage is applied on the liquid crystal lens, the deflection directions of the liquid crystal molecules corresponding to two adjacent electrodes are the same. At this time, a center and an edge of the liquid crystal layer corresponding to the electrodes have no difference in the refractive index.

When a voltage is applied on each of the electrodes of the liquid crystal lens, the liquid crystal molecules corresponding to the electrodes generate deflections, and the liquid crystal molecules corresponding to two adjacent electrodes generate a difference in the refractive index.

Wherein, for each lens unit, the number of the electrodes and the structure of each lens unit are the same. The voltages applied on the same electrodes for each lens unit are the same. In one lens unit, except that the first and the last electrodes are applied with a same voltage, the voltages applied on the other electrodes are different. The liquid crystal molecules corresponding to the electrode which a maximum voltage is applied on are the straightest such that the equivalent refractive index $n_{eff}$ is the smallest.

Please also refer to FIG. 4; FIG. 4 is a curve diagram of the equivalent refractive index corresponding to the lens unit in FIG. 3. Wherein, L1 is a curve diagram of the equivalent refractive index corresponding to the lens unit in an ideal condition. L2 is a curve diagram of the equivalent refractive index corresponding to the lens unit in an actual condition.

The curve of the equivalent refractive index of the lens unit under the function of an electric field is a parabola with a downward opening. The liquid crystal molecules corresponding to the electrode which the maximum voltage is applied on has the smallest equivalent refractive index under the function of the electric field.

Because in the electrodes disposed separately, a height of the electrode which the maximum voltage is applied on is lower than a height of an adjacent electrode. A side electric field is generated between the electrode which the maximum voltage is applied on and the adjacent electrode. Under the function of the side electric field, the squeeze-push behavior between the liquid crystal molecules corresponding to the electrode which the maximum voltage is applied on and the adjacent electrode is reduced such that the actual equivalent refractive index $n_{eff}$ of the liquid crystal molecules corresponding to the electrode which the maximum voltage is applied on is close to an equivalent refractive index $n_0$ ($n_0$=1.55) in an ideal condition. At this time, the actual equivalent refractive index $n_{eff}$ of the lens unit is that $1.56 \leq n_{eff} < 1.58$.

In the present embodiment, the maximum voltage applied on each of the first and the last electrodes in each lens unit is 12V. The voltages applied on the other electrodes can be set according to an actual requirement. In another embodiment, the maximum voltage can be set to be another value.

In the present embodiment, the method for realizing that the height of the electrode which the maximum voltage is applied on is lower than the adjacent electrode among the electrodes disposed separately is: a height of an insulation layer corresponding to the electrode which the maximum voltage is applied on is lower than a height of an insulation layer corresponding to the adjacent electrode. At this time, the actual equivalent refractive index $n_{eff}$ of the liquid crystal lens is that $1.56 \leq n_{eff} < 1.58$. In another embodiment, other methods may be used to realizing that the height of the electrode which the maximum voltage is applied on is lower than the adjacent electrode among the electrodes disposed separately.

By the above embodiments, through the height of the electrode which the maximum voltage is applied on is lower than the height of the adjacent electrode, and using the function of the side electric field to reduce the squeeze-push behavior between the liquid crystal molecules corresponding to the electrode which the maximum voltage is applied on and the adjacent electrode such that the actual equivalent refractive index $n_{eff}$ of the liquid crystal molecules corresponding to the electrode which the maximum voltage is applied on is close to an equivalent refractive index in an ideal condition. As a result, the three dimensional (3D) crosstalk can be reduced and the 3D display effect can be improved.

Figure 5:
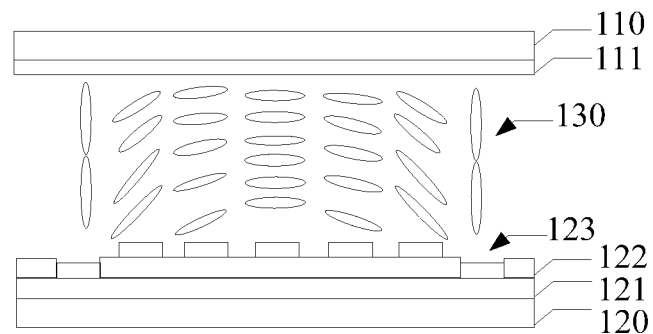
FIG. 5 is a schematic diagram of a lens unit of a liquid crystal lens according to another embodiment of the present invention.

With reference to FIG. 5, FIG. 5 is a schematic diagram of another structure of a lens unit according to another embodiment of the present invention. The difference is that the insulation layer corresponding to the electrode which the maximum is applied on is empty. That is, the first and the last electrodes of each of the lens units are directly disposed on the metal layer such that among the multiple electrodes disposed separately, the height of the electrode which the maximum voltage is applied on is lower than the height of the adjacent electrode. At this time, the actual equivalent refractive index of the liquid crystal lens is 1.56.

By the above embodiment, through the insulation layer corresponding to the electrode which the maximum voltage is applied on is empty such that the height of the electrode which the maximum voltage is applied on is lower than the height of the adjacent electrode. And using the function of the side electric field to reduce the squeeze-push behavior between the liquid crystal molecules corresponding to the electrode which the maximum voltage is applied on and the adjacent electrode such that the actual equivalent refractive index $n_{eff}$ of the liquid crystal molecules corresponding to the electrode which the maximum voltage is applied on is close to an equivalent refractive index in an ideal condition. As a result, the three-dimensional (3D) crosstalk can be reduced and the 3D display effect can be improved.

Figure 6:
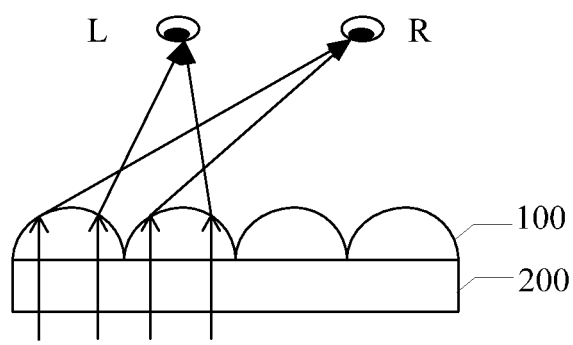
FIG. 6 is a schematic diagram of a liquid crystal display device according to an embodiment of the present invention.

With reference to FIG. 6, FIG. 6 is schematic diagram of a liquid crystal display device according to an embodiment of the present invention. The liquid crystal display device includes a liquid crystal lens 100 and a display screen 200. The liquid crystal lens 100 is disposed on a surface (i.e. a light emitting side) of the display screen 200. The liquid crystal lens 100 is the liquid crystal lens described above.

When no voltage is applied on the liquid crystal lens 100, the deflection directions of the liquid crystal molecules corresponding to adjacent two electrodes are the same. At this time, a center and an edge of the liquid crystal layer corresponding to the electrodes have no difference in the refractive index. The viewer can obtain a two-dimensional (2D) image without a parallax through the liquid crystal lens 100.

When a voltage is applied on the liquid crystal lens, the liquid crystal molecules corresponding to the electrodes generate deflections under the function of the electric field. The liquid crystal molecules corresponding to the adjacent two electrodes generate a difference in the refractive index. And in a focus mode, phases form a lens-like distribution. The viewer can obtain a 3D image with a left-right parallax through the liquid crystal lens 100.

By the above embodiment, through the height of the electrode which the maximum voltage is applied on is lower than the height of the adjacent electrode. And using the function of the side electric field to reduce the squeeze-push behavior between the liquid crystal molecules corresponding to the electrode which the maximum voltage is applied on and the adjacent electrode such that the actual equivalent refractive index $n_{eff}$ of the liquid crystal molecules corresponding to the electrode which the maximum voltage is applied on is close to an equivalent refractive index in an ideal condition. As a result, the three-dimensional (3D) crosstalk can be reduced and the 3D display effect can be improved.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal lens, comprising:
a first substrate;
a second substrate disposed oppositely to the first substrate;
a liquid crystal layer disposed between the first substrate and the second substrate, and having liquid crystal molecules; and
multiple lens units, wherein, a first and a second electrode of each of the lens units define an opening width value of one of the multiple lens units, and the first and the second electrode are applied with a same and maximum voltage in the one of the multiple lens units;
wherein, a metal layer, a first insulation layer, and an electrode layer are stacked on a side of the second substrate adjacent to the first substrate, and the first insulation layer is disposed on the metal layer; the electrode layer includes multiple electrodes disposed separately, and the multiple electrodes include the first electrode and the second electrode which are directly disposed on the metal layer, and an adjacent electrode disposed on the first insulation layer, and the adjacent electrode is disposed between the first electrode and the second electrode; among the multiple electrodes disposed separately, a height of the first or the second electrode which the maximum voltage is applied on is lower than a height of the adjacent electrode such that the liquid crystal molecules corresponding to the first or the second electrode which the maximum voltage is applied on forms a smallest refractive index in the one of the multiple lens units.

2. The liquid crystal display device according to claim 1, wherein, the maximum voltage applied on the first and the second electrodes is 12V.

* * * * *